United States Patent [19]

Kuklo

[11] Patent Number: 4,523,612

[45] Date of Patent: Jun. 18, 1985

[54] APPARATUS AND METHOD FOR SUPPRESSING VIBRATION AND DISPLACEMENT OF A BELLOWS

[75] Inventor: Thomas C. Kuklo, Ripon, Calif.

[73] Assignee: The United States of America as represented by the United States Department of Energy, Washington, D.C.

[21] Appl. No.: 485,155

[22] Filed: Apr. 15, 1983

[51] Int. Cl.³ .............................................. F16L 55/04
[52] U.S. Cl. ........................................ 138/30; 138/26; 417/540; 181/207; 181/208; 285/49; 285/226
[58] Field of Search ........................... 138/26, 30, 121; 417/540, 2; 137/87; 267/136, 141.2, 140.1; 415/502; 285/49, 114, 226, 97; 181/207, 208; 92/41

[56] References Cited

U.S. PATENT DOCUMENTS

| | | | |
|---|---|---|---|
| 2,010,546 | 8/1935 | Kenney | 285/49 X |
| 2,241,245 | 5/1941 | Daniels | 285/49 X |
| 2,677,393 | 5/1954 | Cornelius | 138/30 X |
| 2,919,715 | 1/1960 | Rockwell | 138/30 X |
| 3,061,039 | 10/1962 | Peters | 138/26 X |
| 3,420,553 | 1/1969 | Poxon et al. | 285/49 |
| 3,766,992 | 10/1973 | Tiraspolsky et al. | 138/30 |
| 3,874,708 | 4/1975 | Greasens | 285/226 X |

FOREIGN PATENT DOCUMENTS

| | | | |
|---|---|---|---|
| 1096461 | 12/1967 | United Kingdom | 285/49 |
| 773378 | 10/1980 | U.S.S.R. | 138/26 |

Primary Examiner—James E. Bryant, III

Attorney, Agent, or Firm—Shyamala T. Rajender; Harold M. Dixon; Judson R. Hightower

[57] ABSTRACT

Flexible bellows are utilized between two systems, such as a pumping system and a process station, to partially absorb system vibrations and to compensate for misalignment between the systems. It is common practice to either clamp a rigid spacer between flanges of the two systems (FIG. 3B) to separate them from each other, or to maintain the bellows in unsupported relationship between these systems (FIG. 4B). In the former bellows arrangement, the rigid spacer transmits vibratory energy between the two systems and the bellows tends to function as an undamped or underdamped unit that resonates at its own frequency to create additional vibratory energy, transmitted to the systems. In the latter, unsupported bellows arrangement (FIG. 4B), the pressure differential prevalent between the fluid flowing through the bellows and ambient normally causes extension or retraction of the bellows and resulting misalignment problems. The present invention substantially solves the above vibration and misalignment problems by providing an inflatable tube (20) in surrounding relationship about a bellows (14) to suppress vibration and displacement thereof. A method for isolating first and second systems (11,12) from each other to prevent the transmission of vibratory energy therebetween comprises the steps of attaching at least one flexible bellows (14) between the systems (11,12), surrounding the bellows with an inflatable tube (20), and maintaining a predetermined pressure in the tube (20) to urge the tube in flexible contact with at least some of the convolutions of the bellows (14).

8 Claims, 8 Drawing Figures

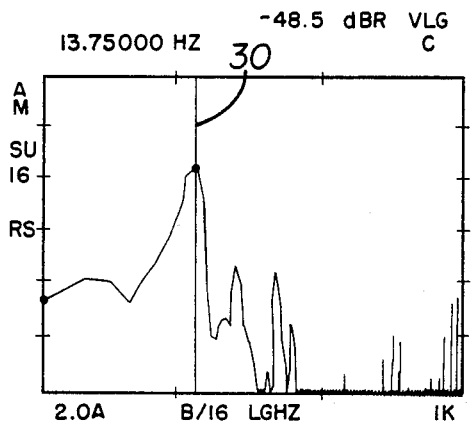
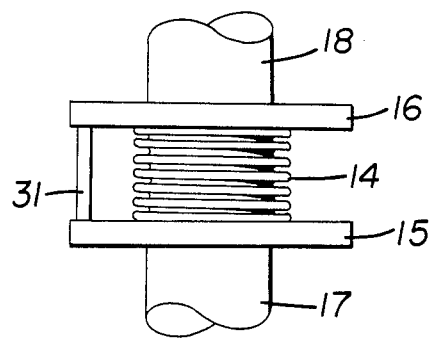
FIGURE 3A  FIGURE 3B
(Prior Art)
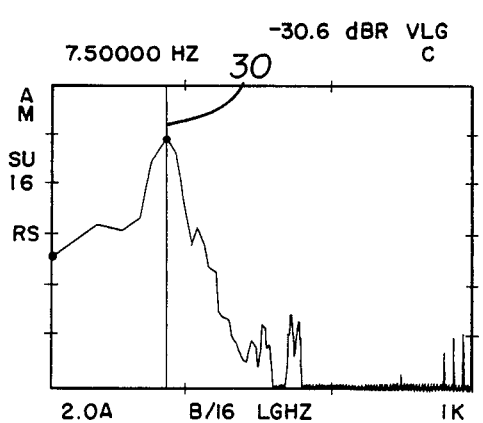
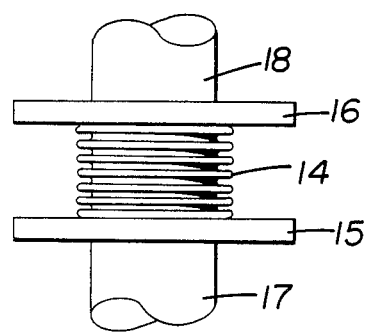
FIGURE 4A  FIGURE 4B
(Prior Art)
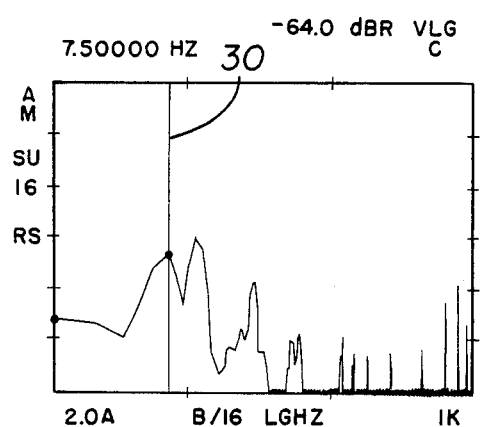
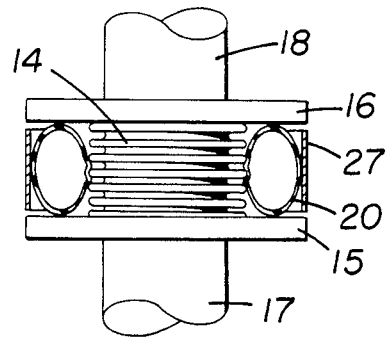
FIGURE 5A  FIGURE 5B

APPARATUS AND METHOD FOR SUPPRESSING VIBRATION AND DISPLACEMENT OF A BELLOWS

The U.S. Government has rights in this invention pursuant to Contract No. W-7405-ENG-48 between the U.S. Department of Energy and the University of California.

DESCRIPTION

Background of the Invention

The present invention relates generally to an apparatus and method for suppressing vibration and displacement of a flexible bellows, and more particularly to an inflatable and flexible tube surrounding the bellows to effect such suppression.

Conventional gas handling or vacuum systems normally include a vibrating pumping system connected to a process station by one or more flexible metal bellows. The bellows functions to partially absorb vibrations generated by the pumping system and to compensate for misalignment between the pumping system and the process station. The bellows provides only a small amount of vibration isolation and the pressure differential between the internal fluid pressures in the bellows and ambient, will cause the bellows to expand and contract to accentuate the misalignment problem. Likewise, when coiled hoses, compound bellows, or short hose couplings are utilized to interconnect the pumping system and the process station, the vibration and misalignment problems still remain.

One solution to the misalignment problem has been to rigidly attach flanges of the pumping system and process station together by a rigid spacer (FIG. 3B). However, the spacer functions to transmit vibrations from the pumping system to the process station and thus does not maintain them in a condition of vibration isolation. An additional disadvantage of the rigid spacer approach is that the metal bellows will behave as an undamped or underdamped connector that resonates at its own frequency to thus create bellows vibrations which are transmitted to the process station.

Other attempts to dampen vibrations occurring in the bellows have exhibited similar deficiencies. For example, it has been proposed to at least partially fill or encapsulate the convolutions of a bellows with an elastomeric material to alleviate the vibration problem. However, such attempts have not fully solved the vibration and misalignment problems, particularly apparent with the above type of apparatus wherein a pumping system is connected to a process station, nor are they capable of "tuning" for purposes of applying the desired degree of restraining force on the bellows.

Summary of the Invention

An object of the present invention is to substantially overcome the above vibration and misalignment problems by providing an apparatus and method for efficiently suppressing vibration and displacement of a flexible bellows. A more specific object of the present invention is to provide such suppression desiderata for one or more bellows interconnected between a pair of systems, such as a vibrating pumping system and a process station, to substantially isolate them from each other.

Additional objects, advantages, and novel features of this invention will be set forth in part in the description which follows, and in part will become apparent to those skilled in the art upon examination of the following, or may be learned by practice of the invention. The objects and advantages of this invention may be realized and attained by means of the instrumentalities, combinations, and method steps particularly pointed out in the appended claims.

To achieve the foregoing and other objects and in accordance with the purpose of the present invention, as embodied and described herein, in its broadest aspect the apparatus of this invention may comprise a flexible bellows and inflatable damping means, preferably an elastomeric tube, surrounding the bellows for suppressing vibration and displacement thereof.

Preferably, the bellows and surrounding damping means are interconnected between a pair of systems, such as a vibrating pumping system and a process station, for isolating the systems from each other.

In another aspect of this invention, a method for isolating a pair of systems from each other to prevent the transmission of vibratory energy therebetween comprises the steps of attaching a flexible bellows between the systems, surrounding the bellows with an inflatable tube, and maintaining a predetermined pressure in the tube to maintain the tube in flexible bearing contact with at least some of the convolutions of the bellows.

The benefits and advantages of the present invention will become particularly apparent upon perusal of the experimental comparisons hereinafter described (FIGS. 3A-5B). In particular, the present invention (FIGS. 5A and 5B) makes possible the obtainment of resolution down to a single fringe or pulse of disturbance; this degree of resolution not having been possible on a standard Target Fab Vacuum System before application of this invention thereto. This invention has particular application to any vibrating mechanical system having rigid ports interconnected by at least one flexible bellows and wherein vibrations and/or displacements are a problem.

Brief Description of the Drawings

The accompanying drawings, which are incorporated in and form a part of the specification, illustrate a preferred embodiment of the present invention and, together with the description, serve to explain the principles of the invention. In the drawings:

FIG. 3A illustrates experimental data depicting the damping capabilities of a conventional supported bellows arrangement, shown schematically in FIG. 3B;

FIG. 4A illustrates experimental data depicting the damping capabilities of a conventional unsupported bellows arrangement, shown schematically in FIG. 4B; and FIG. 5A illustrates experimental data depicting the enhanced damping capabilities of this invention, as embodied by the apparatus illustrated in FIG. 2 and also shown schematically in FIG. 5B for comparison purposes.

Figure 2:
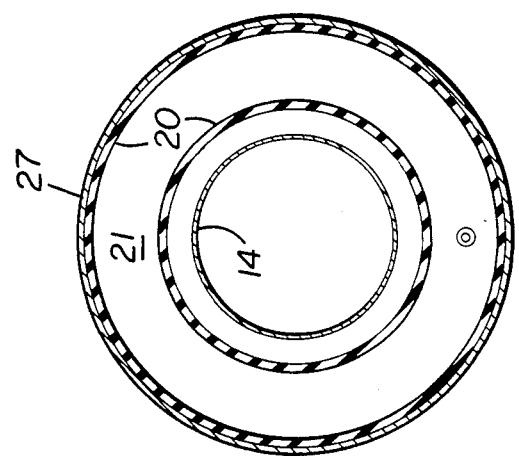
FIG. 2 is a cross-sectional view, taken in the direction of arrows II—II in FIG. 1.

Reference will now be made in detail to a preferred embodiment of this invention, an example of which is illustrated in FIGS. 2, 3, and 5B of the drawings.

Detailed Description of the Invention

Figure 1:
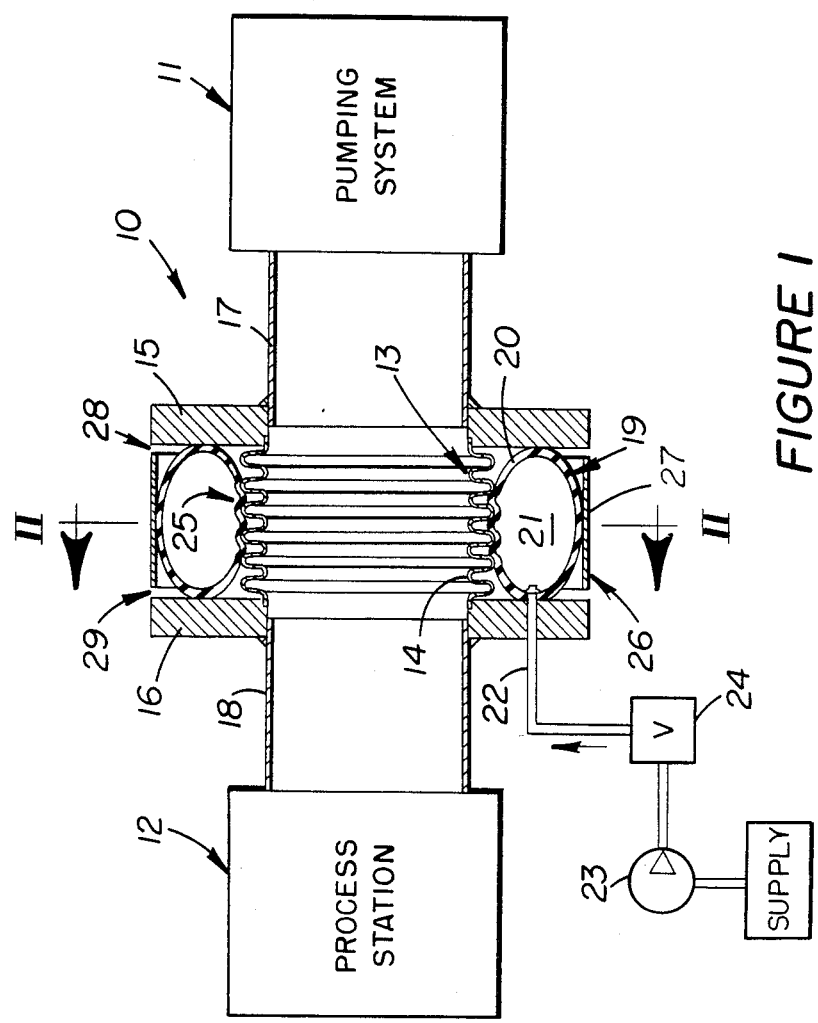
FIG. 1 is an enlarged, partially sectioned side elevational view of a flexible bellows interconnected between a pair of systems and an inflatable tube, embodying this invention, mounted on the bellows to suppress vibration and displacement thereof.

FIGS. 1 and 2 illustrate an integrated system 10 comprising a first system 11 connected to a second system 12 for purposes of performing a particular job task. For example, first system 11 could comprise a conventional pumping system fixed in place for drawing a vacuum on fixed or movable (e.g., mounted on air bearings) second system or process station 12. In high-vacuum pumping systems, for example, steam ejectors, Roots-type blowers, diffusion-ejector oil vapor pumps, and rotary piston pumps may be used to produce pressures in the range of from $10^{-1}$ to $10^{-4}$ torr.

The produced vacuum can be drawn on a process station for numerous applications, such as for distillation of plasticizers, fat-soluble vitamins, and certain other organic chemicals; for dehydration of frozen foods, animal tissues, blood plasma, serum and antibiotics; for refining, degassing, and casting of metals in vacuum furnaces; for vacuum sintering of cermets and powder metallurgy parts; for vacuum annealing of special alloys; and for pumping-down vacuum chambers to a pressure at which high-vacuum pumps can begin operation.

It will become apparent to those skilled in the arts relating hereto that this invention, in its broadest aspects, has application to systems, other than pumping systems, wherein vibrational damping or snubbing of other types of mechanical systems is required, e.g., various types of valves requiring operation in a substantially vibration-free environment. In the preferred application of this invention, it is employed in systems and arrangements of the above type wherein a bellows is employed to compensate for axial, lateral, or combined axial and lateral deflections, and further functions to partially absorb vibrations.

FIG. 1 further illustrates means 13 for communicating fluid between first and second systems 11,12, including at least one flexible bellows 14. In the embodiment illustrated, the bellows is brazed, welded, or otherwise suitably secured to a pair of radial members or flanges 15,16 which are, in turn, suitably secured to a pair of metal conduits 17,18. The conduits are suitably connected to the first and second stations 11,12, respectively, and form structural parts thereof along with the flanges.

Bellows 14 may be of the formed or welded type and composed of thin-walled stainless steel, for example. The bellows may be purchased as an off-the-shelf item to exhibit the desired design parameters for a particular application, e.g., the desired spring-constant and pressure rating. During the type of pumping operation illustrated schematically in FIG. 1, operation of pumping system 11 will transmit vibrational energy to bellows 14. The crux of this invention resides in surrounding the bellows with an inflatable damping means 19 for suppressing vibration and displacement of the bellows to thus substantially isolate pumping station 11 from process station 12. As indicated above, the damping means and bellows combination has application to other types of systems wherein damping or snubbing of mechanical vibration is required.

Damping means 19 preferably comprises an inflatable elastomeric bladder or tube 20 defining a pressurizable closed annular chamber 21 therein. The tube can, of course, be suitably configured and composed to adapt it for a particular application and various vibrational modes of operation. The polymeric material composing the tube may comprise any standard natural or synthetic rubber, such as silicone rubber, that will provide the desired mechanical or viscoelastic properties (bulk modulus, shear modulus, Young's modulus, etc.). As schematically illustrated in FIG. 1, a supply conduit 22 can be suitably connected to tube 20 to selectively pressurize chamber 21 with air or other suitable fluid (e.g., silicone fluid, fluorocarbon gas, etc.) under control of a pump 23 and a valve 24.

A predetermined pressure can thus be maintained in inflation chamber 21 of the tube to maintain the tube in flexible contact with at least some of the convolutions of bellows 14, as illustrated at 25 in FIG. 1. In the preferred embodiment of this invention, a restraining means 26, shown in the form of a rigid metallic hoop 27, surrounds tube 20 to limit radial expansion of the bladder to a predetermined maximum. In addition, the hoop will function to force the inner diameter of the annular tube into bearing contact within at least some of the convolutions of the bellows, as illustrated at 25 in FIG. 1.

The axial length of hoop 27 is preferably slightly less than the longitudinal distance between flanges 15, 16 to provide clearances 28, 29 preventing metal-to-metal contact between the axially spaced hoop and flanges. Otherwise, some vibrational energy generated in pumping system 11 would be transmitted to process station 12 through the hoop.

In carrying forth the method aspects of the invention, subsequent to attaching bellows 14 between stations 11,12 (via flanges 15,16 and conduits 17,18) and surrounding the bellows with tube 20, a predetermined pressure can be maintained in chamber 21 of the tube to urge and maintain it in flexible bearing contact at 25 (FIG. 1) with at least some of the convolutions of the bellows. The bladder will thus counteract any displacement of the bellows and flanges due to pressure differentials occurring between the fluid pressure in the bellows and ambient.

The anti-displacement function will be accompanied by a damping or snubbing effect on the bellows to substantially reduce the amplitudes and periods of vibrations transmitted from pumping system 11 towards process station 12. It should be noted in FIG. 1 that tube 20 is preferably expanded longitudinally, as well as radially, to contact flanges 15, 16 to further aid in the damping and antidisplacement functions. An additional advantage of this invention is that tube 20 can be suitably configured, composed, and scaled to adapt it to a wide variety of bellows configurations and systems.

The inflatable nature of the tube provides a range of "tuning" of the bladder for any particular application, e.g., chamber 21 is preferably pressurized to a level greater than the maximum pressure level of the fluid communicated through bellows 14. Any suitable gas or liquid can be utilized to inflate bladder 20, e.g., air, a silicone liquid having a viscosity in the range of from 0.65 to 100,000 centistokes (Dow-Corning 200 Silicone Fluid), or a fluoro-carbon gas, such as Freon.

FIGS. 3A, 4A, and 5A illustrate experimental data depicting the vibrational damping capabilities of the bellows arrangements illustrated in FIGS. 3B, 4B, and 5B, respectively. In the photocopies illustrated in the former figures, the horizontal scale depicts log-hertz within a range of from 0 to 1.0 Khz, the vertical scale depicts decibels (dB) with each division representing ten dB, and a cursor 30 is shown positioned on a peak frequency of 13.75 HZ in FIG. 3A and 7.5 HZ in FIGS. 4A and 5A (automatically read-out during experimentation, as shown in the upper left-hand corner of these figures).

The dB amplitude of the frequency, as marked by the cursor, was also automatically read-out during experimentation and is shown as −48.5 dBR in FIG. 3A, −30.6 dBR in FIG. 4A, and −64.0 dBR in FIG. 5A. The notation "SU 16" on these figures indicates that 16 sample sweeps of the spectrum analyzer were made for that particular trace. The input to the analyzer constituted a "Geo Space Corp" horizontal geophone, the output of which was 13.56 volts/in./sec. velocity.

Referring to FIGS. 3B, 4B, and 5B, bellows 14 was a standard bellows manufactured by Metal Bellows Corporation of Chatsworth, Calif. The pumping system attached to conduit 17 constituted a Leybold-Heraeus Trivac Model No. S8A. Referring to FIG. 5B, tube 20 constituted a 5.30/4.50×6 in. miniature rubber inner tube whereas hoop 27 constituted a metallic clamping ring having an inside diameter slightly less than the outside diameter of the normally inflated (30 psi) tube. The process station attached to conduit 18 was designed to require a mechanical stability of at least 0.003 in./sec. velocity, 0.000016 in. displacement, and 0.0015 G's (0.603 in./sec.$^2$).

Referring first to FIGS. 3A and 3B, it should be noted that the tested bellows arrangement included a rigid spacer or support 31 secured between flanges 15,16. As shown in FIG. 3A, the peak frequency of 13.75 HZ was accompanied by a −48.5 dB amplitude.

Referring to the experiment illustrated in FIGS. 4A and 4B, conducted on an unsupported bellows 14, a peak frequency of 7.5 HZ was accompanied by a −30.6 dB amplitude.

Now referring to FIGS. 5A and 5B, drawn to experimental testing of the embodiment of this invention described herein, it should be noted that a peak frequency of 7.5 HZ was accompanied by a −64.0 dB amplitude. Thus, the FIG. 5B arrangement, embodying this invention, exhibited an increased amplitude of 33.4 dB, as compared with the 30.6 dB amplitude achieved by the unsupported bellows arrangement of FIG. 4B. This reduction in vibration amplitude is a significant indication that tube 20 functioned to substantially suppress vibrations generated in the tested system.

The foregoing description of a preferred embodiment of this invention has been presented for illustration and description purposes only. It is not intended to be exhaustive or to limit the invention to the precise form disclosed, and obviously many modifications and variations are possible in light of the above teachings, as suggested above. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. An integrated system (10) comprising:
    a first system (11) including a first radially disposed member (15);
    a second system (12) including a second radially disposed member (16);
    said first and second radially disposed members (15 and 16) positioned on a respective side of inflatable damping means (19) and in contact therewith;
    means (13) for communicating fluid between said first system (11) and said second system (12), including at least one flexible bellows (14), said bellows including therein a plurality of convolutions, interconnected therebetween and secured between said first and second radially disposed members (15 and 16); and
    said inflatable damping means (19) surrounding said bellows (14) in flexing relationship therewith for suppressing vibration and displacement thereof to substantially isolate said first (11) and said second (12) systems from each other.

2. The integrated system (10) of claim 1 further including restraining means (26) providing with a hoop (27) disposed in surrounding relationship about said damping means (19).

3. The integrated system (10) of claim 1, further including restraining means (26) provided with a hoop (27) disposed in surrounding relationship about said damping means (19), wherein each of said first (11) and second (12) systems includes a radial flange (15,16) disposed on a respective side of said damping means (19) and wherein said hoop (27) is disposed in axially spaced relationship (28,29) relative to each said flange (15,16).

4. The integrated system (10) of claim 1 further including means (22) for selectively pressurizing said damping means (19) to apply a predetermined pressure about said bellows (14), wherein said means (22) for pressurizing said damping means (19) includes a fluid selected from the group consisting of air, a silicone fluid, and a fluorocarbon gas.

5. The integrated system (10) of claim 1 wherein said first system (11) comprises a pumping system and said second system (12) comprises a process station.

6. Apparatus comprising:
    a flexible bellows (14) including therein a plurality of convolutions;
    inflatable and flexible tube means (19) surrounding said bellows (14) for suppressing vibration and displacement thereof; and
    radially disposed members (15 and 16) positioned on each side of said tube means (19) and in contact therewith, said bellows (14) being secured between said members (15 and 16).

7. The apparatus of claim 6 further including restraining means (26) for limiting radial outward expansion of said tube means (19), wherein said restraining means (26) includes a hoop (27) disposed in surrounding relationship about said tube means (19), and further including a radial flange (15,16) disposed on each side of said tube means (19) and wherein said hoop (27) is disposed in axially spaced relationship (28,29) relative to each said flange (15,16).

8. The apparatus of claim 6, further including means (22) for selectively pressurizing said tube means (19) to apply a predetermined pressure about said bellows (14), wherein said means (22) for pressurizing said tube means (19) includes a fluid selected from the group consisting of air, a silicone fluid, and a fluorocarbon gas.

* * * * *